Feb. 7, 1967  W. F. DUGAN  3,302,700
BLENDER HEAT EXCHANGER APPARATUS
Filed March 9, 1965
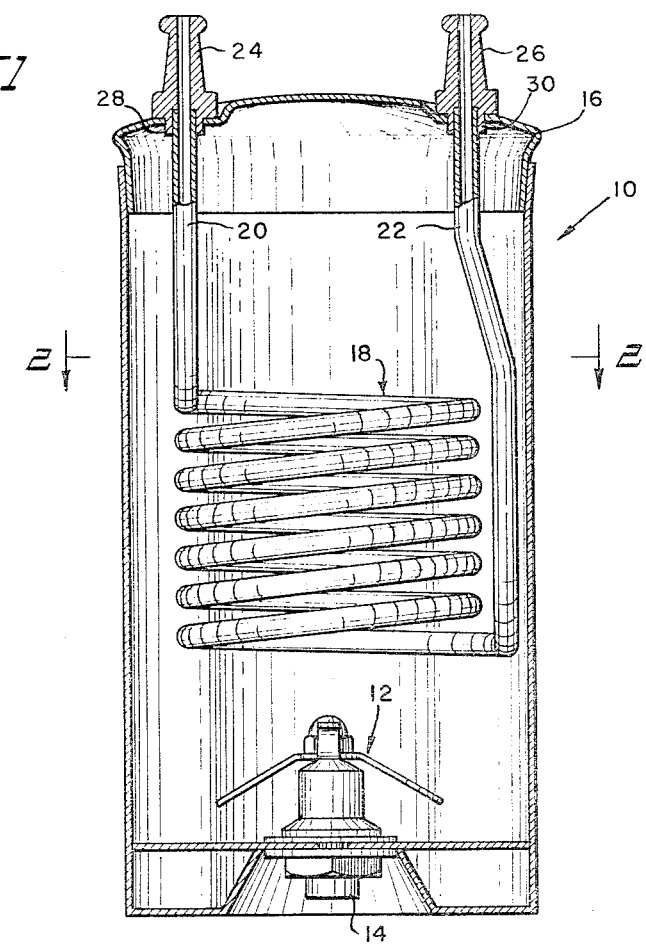
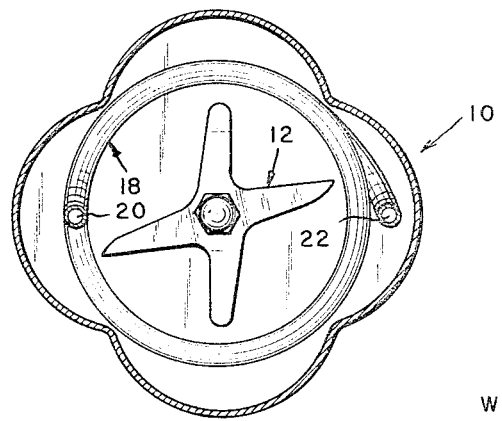
INVENTOR
WILLIAM F. DUGAN

United States Patent Office 3,302,700
Patented Feb. 7, 1967

3,302,700
BLENDER HEAT EXCHANGER APPARATUS
William F. Dugan, Stamford, Conn., assignor to Dynamics Corporation of America, New York, N.Y., a corporation of New York
Filed Mar. 9, 1965, Ser. No. 438,287
1 Claim. (Cl. 165—109)

The present invention relates to improvements in electric motor driven blenders and is concerned more particularly with heat exchange means for controlling the temperature of material being treated in the blender container.

It is well known that rapidly rotating blender blades create frictional heat which often has a deleterious effect upon the materials being blended. This undesirable action is particularly pronounced where blenders are used in laboratories or the like and temperature control of blended ingredients, such as chemicals, is a critical factor.

Efforts heretofore have been made to effect temperature control in blenders such as by the provision of blender containers having cooling jackets or the like which increase the weight and bulk of the container and further interfere with the manipulation or dispensing of blended materials from the container.

It is the principal object of this invention to avoid the disadvantages of prior blender heat exchange constructions and to provide a simple structural means effectively to control the temperature within a blender container.

More particularly, the invention contemplates the provision of heat exchange means carried by the lid or cover for the blender container and which is removable with the cover for cleaning or sterilizing and leaving the temperature regulated materials within the blender container available for disposition in an ordinary unrestricted manner.

The invention, more specifically, provides for a blender container lid or cover which has secured thereto a depending coil for the circulation of a heat exchange fluid medium which is inserted interiorly of the blender container and immersed in the body of the materials being treated. When the cover is normally positioned over the upper open ended mouth of the blender container, the heat exchange means, which preferably is in the form of a helical coil, may thus be positioned adjacent the source of the frictional heat and in effective direct heat exchange contact with the bulk of the materials undergoing blending.

Other objects and advantages will be apparent from the following detailed description taken in conjunction with the accompanying drawings wherein a preferred embodiment of the principles of the invention has been selected for exemplification.

In the drawings:

FIG. 1 is a vertical sectional view through a blender container and cover equipped with a depending heat exchange helical coil constructed in accordance with the present invention; and FIG. 2 is a transverse sectional view taken on the line 2—2 of FIG. 1 and looking in the direction of the arrows.

Referring more particularly to the drawings, wherein like numerals refer to like parts, 10 designates in its entirety a blender container having a high speed rotating blade assembly 12 positioned at its bottom and a depending blade shaft 14 for rotating engagement with an electric motor drive shaft carried by a blender base which is not shown because it forms no part of the present invention. A removable lid or cover 16 fits and encloses the upper open mouth of the container. The blender container 10 illustrated is of the lobular sidewall configuration characteristic of the Waring Blendor but it is to be understood that the heat exchange device now to be described is adapted for use with any other type of blender or blender cover.

The heat exchange structure preferably is in the form of a hollow helical coil 18 having upright fluid ingress and egress lines 20 and 22 for the circulation of any suitable cooling medium. The direction of flow may be reversible if desired.

For connecting the coil 18 to a source of heat exchange fluid, nipples or the like 24 and 26 project outwardly of the cover 16 for receiving the ends of conduits such as flexible rubber or plastic tubing. The cover 16 is apertured to receive integral annular shanks 28 and 30 depending from the nipples 24 and 26, respectively, such shanks opening inwardly of the cover 16 to receive and support the upright tubes 20 and 22 and of the coil 18. The cover, the nipples and the coil tubing are preferably brazed or otherwise suitably secured together so that the cover 16 and coil 18 are removable and replaceable as a unit relative to the container 10.

It is to be understood that with an upright lobular sidewall container 10, as shown in FIG. 2, the material to be blended is circulated by the high speed rotating blade means 12 in a plurality of upright columns defined by said lobular sidewalls and, also as apparent from FIG. 2, that the laterally extending helical coil 18 through which the heat exchange fluid circulates is positioned centrally of the container spaced from the lobular sidewalls and traverses each of the plurality of columns when the cover 16 is applied to the container 10 as shown in FIG. 1.

It will be apparent that the coil 18 is arranged for immersion in the body of the materials being blended within the container 10 for efficient heat exchange contact therewith. It will also be apparent that when the cover 16 is removed the container 10 may be handled in the ordinary manner to dispense the temperature regulated blended materials therein without any hinderance from the temperature regulating coil or its connections.

It is to be understood that the present invention is not confined to the particular structure herein illustrated and described but embraces all such modifications thereof as come within the scope of the following claim.

I claim:
An electric motor driven blender comprising,
an upright container having lobular sidewalls defining a plurality of upright columns for receiving material to be blended;
high speed rotating blade means supported at the bottom of said container and circulating said material in said plurality of upright columns defined by said lobular sidewalls;
a removable cover fitted to said container;
a hollow laterally extending helical coil for the circulation of heat exchange fluid carried and depending from said cover;
said helical coil being inserted centrally of said container spaced from said lobular sidewalls and traversing each of said plurality of columns when said cover is applied to said container; and fluid connecting means for said coil projecting outwardly of the said cover.

References Cited by the Examiner

UNITED STATES PATENTS

| | | | |
|---|---|---|---|
| 2,084,614 | 6/1937 | Goecke | 165—109 X |
| 2,283,904 | 5/1942 | Baumgarden | 165—74 X |
| 2,951,684 | 6/1960 | Labbe | 165—109 X |
| 2,991,161 | 7/1961 | Gasche | 165—74 X |
| 3,057,603 | 10/1962 | Isreeli | 165—74 |

FOREIGN PATENTS 659,774  5/1938  Germany.

ROBERT A. O'LEARY, *Primary Examiner.*

M. A. ANTONAKAS, *Assistant Examiner.*